Figure 1:
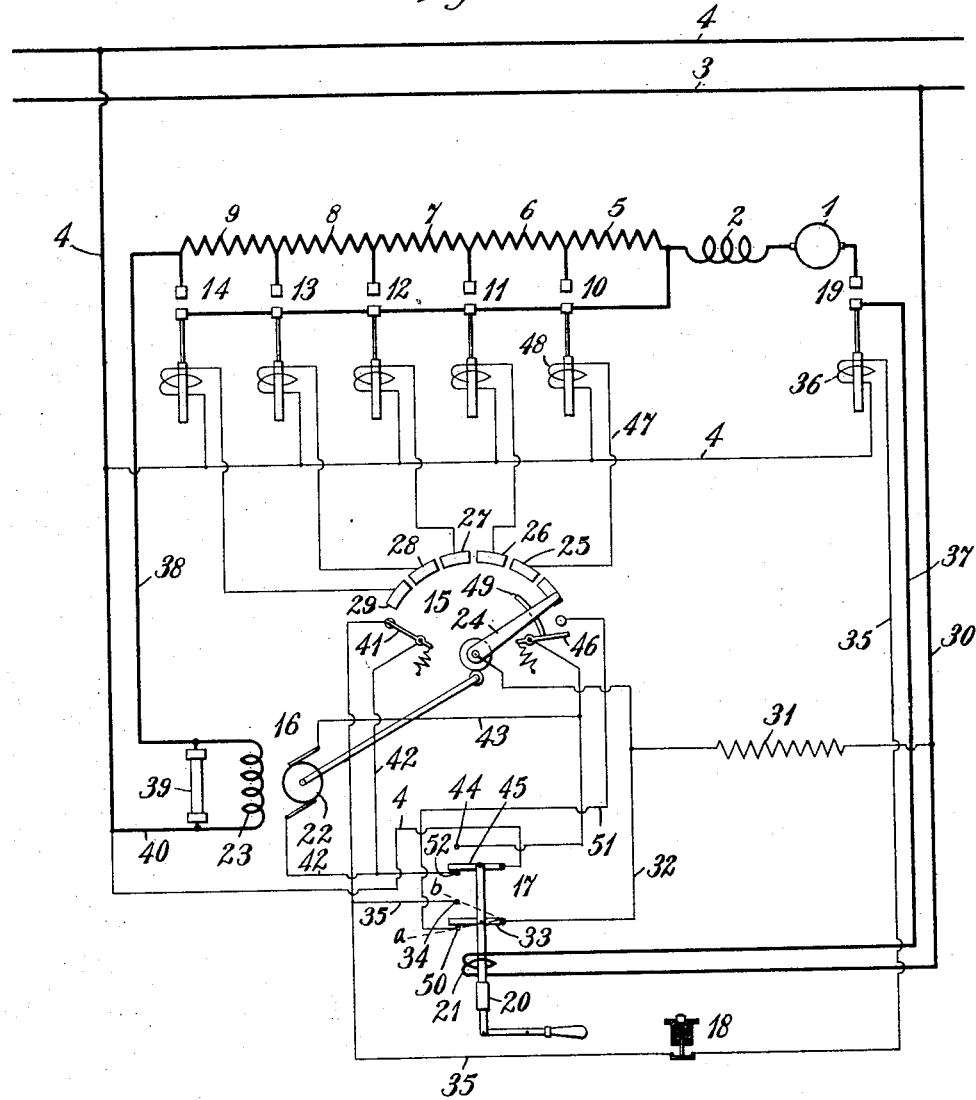

T. VARNEY.
ELECTRIC MOTOR CONTROLLER.
APPLICATION FILED SEPT. 18, 1911.

1,164,038.

Patented Dec. 14, 1915.
2 SHEETS—SHEET 1.

WITNESSES:

INVENTOR
Theodore Varney
BY
ATTORNEY

T. VARNEY.
ELECTRIC MOTOR CONTROLLER.
APPLICATION FILED SEPT. 18, 1911.
1,164,038.
Patented Dec. 14, 1915.
2 SHEETS—SHEET 2.
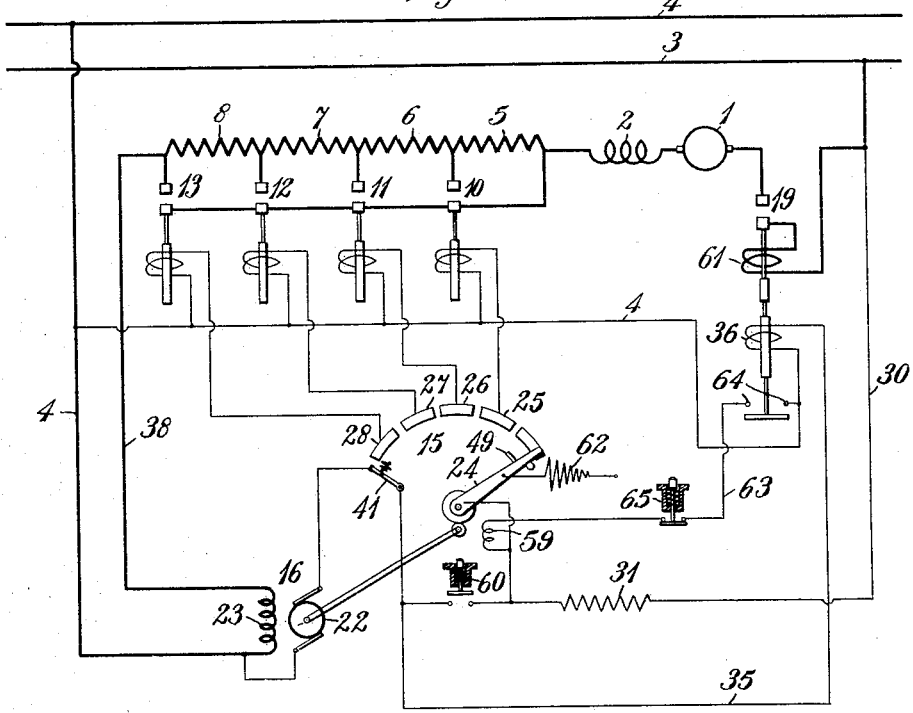
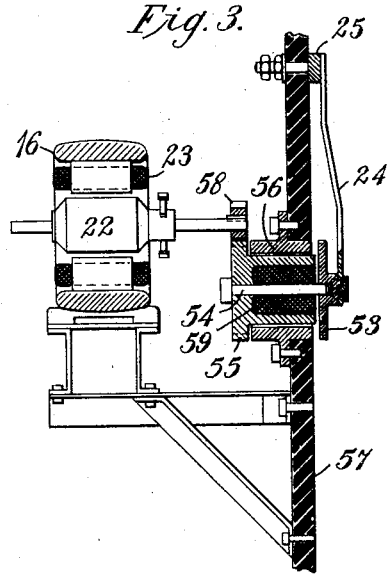
WITNESSES:
Fred H Miller
INVENTOR
Theodore Varney
BY
ATTORNEY

UNITED STATES PATENT OFFICE.

THEODORE VARNEY, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRIC-MOTOR CONTROLLER.

1,164,038.

Specification of Letters Patent.

Patented Dec. 14, 1915.

Application filed September 18, 1911. Serial No. 649,915.

*To all whom it may concern:*

Be it known that I, THEODORE VARNEY, a citizen of the United States, and a resident of Pittsburgh, in the county of Allegheny and State of Pennsylvania, have invented a new and useful Improvement in Electric-Motor Controllers, of which the following is a specification.

My invention relates to control systems for electric motors and it has special reference to such systems as embody electric motor-operated switching devices for governing the main motor circuits.

The object of my invention is to provide a controller of the class above indicated having a pilot motor which is responsive in speed to the current traversing the main motor circuit.

Broadly considered, my invention consists of a motor-operated controller for electric motors, the pilot motor of which is dependent, for the speed of its operation, upon the current traversing the circuit of the main motor.

I do not wish to be limited to any particular type of controller, but my invention is well adapted for use with a controller of the unit switch type comprising a motor-operated master controller which is delayed in its action in accordance with the current traversing the main motor circuit.

Figure 1 of the accompanying drawings, is a diagrammatic view of a control system embodying my invention. Fig. 2 is a view corresponding to Fig. 1 of a slightly modified arrangement which also embodies my invention, and Fig. 3 is a sectional elevation, on a larger scale, of the master controller and its driving motor, shown diagrammatically in Fig. 2.

Referring to Fig. 1 of the drawings, the system here shown comprises a motor having an armature 1 and a field magnet winding 2 which is supplied with energy from any suitable source, through conductors 3 and 4, a resistor composed of sections 5, 6, 7, 8 and 9, which may be replaced by any suitable voltage-adjusting means, resistance-controlling switches 10, 11, 12, 13 and 14, a master switch 15, a small driving motor 16 therefor, hereinafter called the pilot motor, manually operated switching devices 17 and 18 and a line switch 19.

The switch 18 is preferably an ordinary push button switch which is normally held closed, and the switch 17 is provided with a magnetizable armature 20 and a holding coil 21, into the field of which the armature 20 is moved when the switch is adjusted from its normal position $a$ to its position $b$.

The pilot motor 16 comprises an armature 22, a field magnet winding 23 which is either connected directly in series with the main motor circuit or in a circuit derived therefrom.

The master controller 15 comprises a rotatively adjustable arm 24, which is geared to the armature of the motor 16 and a plurality of contact members 25, 26, 27, 28 and 29 with which the arm is adapted to engage in the order named.

The operation of and the circuit connections for the system are as follows: Assuming that the switches and controlling devices occupy the positions shown in the drawings, if the switch 17 is moved from its position $a$ to position $b$, a circuit will be completed from line conductor 3, through conductor 30 and auxiliary resistor 31, which is intended to reduce the voltage on the control circuits and may be omitted if desired, conductor 32, contact terminals 33 and 34 of switch 17, conductor 35, push button switch 18 and coil 36 of the switch 19 to opposite line conductor 4. The coil 36, when energized, closes the switch 19 and completes the motor circuit from conductor 3, through conductor 30, coil 21, conductor 37, switch 19, armature 1, field magnet winding 2, resistor sections 5 to 9, inclusive, conductor 38, field magnet winding 23 of motor 16 which may or may not be paralleled by shunt 39 and conductor 40 to line conductor 4. It thus appears that the coil 21 is energized so that it holds the switch 17 in position $b$, and the motor is connected across the circuit in series with the resistor sections. Furthermore, a control circuit is established from conductor 35, through a limit switch 41 of the master switch 15, conductor 42, armature 22 of the motor 16, conductor 43, and contact members 44 and 45 of switch 17 to line conductor 4.

It is evident that the field of the motor 16 will be strongly energized when the switch 19 is first closed and, consequently, its speed is very slow until the large motor has accelerated somewhat and the current traversing the motor circuit has become materially reduced. The rotation of the small motor produces a counter-clockwise movement of the contact arm 24 into engagement with the contact member 25. The first effect of this movement is to permit the limit switch 46 to close. The engagement of the arm 24 with contact member 25 completes a control circuit from conductor 30, through resistor 31, arm 24, contact 25, conductor 47 and coil 48 of switch 10, to line conductor 4. The switch 10, when closed, short circuits section 5 of the resistor which produces an acceleration of the main motor and temporarily slows down the motor 16 by reason of the increased current following the application of the higher voltage to the main motor terminals.

It is evident that the motor 16 may be so designed as to introduce a time-element between the steps of the acceleration according to the current traversing the motor circuit. Consequently, if the motor is under a light load, the acceleration will be effected quickly while, if it is started under a heavy load, the acceleration will be effected slowly. One of the great advantages in the arrangement of my invention lies in the fact that the motor will, in any case, be accelerated, since the pilot motor will always operate, although its operation may be slow. The action of the pilot motor is repeated for each step as the arm 24 successively engages the contact members 26, 27, 28 and 29 and as the resistor sections 6, 7, 8 and 9 are successively short circuited. Finally, when the arm 24 reaches the end of its travel, the limit switch 41 will be opened by an actuating pawl 49 and the pilot motor circuit which was completed through it will be interrupted. If it is desired to bring the main motor to rest, it is only necessary to temporarily open the push button switch 18, which will deënergize the coil 36, causing the switch 19 to interrupt the main motor circuit and to deënergize coil 21. The switch 17 is thus permitted to fall to position $a$, and the push button may be released without causing the motor to be re-accelerated.

As soon as the switch 17 moves into position $a$, the pilot motor circuit is established from conductor 30, through resistor 31, conductor 32, contact members 33 and 50, conductor 51, limit switch 46, conductor 43, armature 22, conductor 42 and contacts 52 and 45 to line conductor 4. The pilot motor armature will thus be supplied with energy which will produce a clockwise rotation of the arm 24 which will be comparatively rapid since the motor is then operating under a very weak field, due to its residual magnetism. An auxiliary shunt or series field magnet winding may be provided, if desired, for the purpose of giving the pilot motor a field which is independent of the main motor circuit.

Referring to Figs. 2 and 3 of the drawings, the system here shown is similar to the system of Fig. 1, like parts being designated by the same reference characters, except that the pilot motor is arranged to operate in only one direction, a magnetic clutch being introduced between the motor and the arm of the controller, in order to permit the arm to be quickly retracted to its off position in case the line voltage should fail temporarily or when it is desired to bring the main motor to rest.

As shown in Fig. 3, the arm 24, together with the magnetizable plate or disk 53, is attached to the outer end of a stud or bolt 54 which extends loosely through a magnetizable cylindrical member 55. The member 55 is rotatively mounted in a hollow cylindrical bracket or bearing 56 which is attached to an insulating slab or face plate 57 on which the contact members 25 to 29 of the controller are mounted. The rear end of the member 55 is provided with a flange in which gear teeth are cut to coöperate with a gear 58 which is mounted on the shaft of the motor 16. Within the hollow cylindrical member 55 and around the stud 54 is a coil 59 which, when energized, attracts the magnetizable plate or disk 53 to the front end of the member 55, making the two members operate together. Since the arm 24 is secured to the disk 53, a rotative movement of the arm will be effected when the motor is in operation and the coil 59 is energized.

The operation of the system shown in Fig. 2 is as follows: If a push button switch 60, which is normally open, is temporarily closed, assuming that the switches and control mechanisms occupy the positions shown in Fig. 2, a circuit will be established from conductor 3, through conductor 30, resistor 31, push button switch 60, limit switch 41 and motor armature 22 to opposite line conductor 4. Another circuit will be established from push button switch 60 through conductor 35 and coil 36 of switch 19 to conductor 4. The switch 19 will be closed and the main motor circuit will be established from conductor 3 through a holding coil 61 which renders the position of the swtich 19 independent of the coil 36, switch 19, armature 1 and field magnet winding 2, resistor sections 5 to 8, inclusive, conductor 38 and field magnet winding 23 of motor 16 to line conductor 4.

Since the holding coil 61 is connected in series with the motor circuit, the switch 19 will remain closed and it is only necessary to hold the push button switch 60 closed for a very short time in order to have the motor accelerated automatically.

The pilot motor 16 will be started as soon as the circuits above traced are completed, but the coil 59, which operates the clutch and couples the arm 24 to the motor armature, is not energized until the switch 19 is closed, circuit then being completed from conductor 30, through resistor 31, coil 59, conductor 63, contacts 64 of switch 19 to conductor 4. Following the energizing of coil 59, the arm will be rotated in a counter-clockwise direction in opposition to a spring 62, the speed of the motor being varied, as already described in connection with the system of Fig. 1, by reason of the fluctuations in the current traversing the main motor circuit. As the arm is moved successively into engagement with contact members 25, 26, 27 and 28, the switches 10, 11, 12 and 13 will be closed and the resistor sections 5, 6, 7 and 8 short circuited. Finally the limit switch 41 will be opened as before, and the pilot motor will be brought to rest.

In order to prevent the spring 62 from overhauling the motor 16 when the clutch is energized and the motor circuit is interrupted, (by the limit switch 41, for example) it will probably be of advantage to substitute a worm and wheel for the spur gearing between the clutch member 55 and the motor shaft.

With the arrangement shown, the spring 62 should not be sufficiently strong to overhaul the motor and, consequently, the arm will remain in engagement with the contact 28 until the clutch is released by the de-energizing of coil 59. This will be accomplished automatically in case the line voltage falls automatically, since the switch 19 will be opened and the control circuit, through contacts 64, interrupted. A push button switch 65, which is normally closed, may preferably be inserted in the circuit traced, through conductor 63 in order to permit the sections of the resistors to be re-inserted, if desired.

It is evident that the arm 24 and the contact segments coöperating therewith may be utilized to govern the main motor circuit directly and that other variations in arrangement and circuit connections may be effected within the spirit and scope of my invention.

I claim as my invention:

1. A control system comprising a main motor, a resistor, means for gradually excluding the resistor from the circuit to accelerate the motor and a pilot motor for operating said means, the speed of said pilot motor being varied inversely as the current traversing the main motor circuit varies.

2. A control system comprising a main motor, an accelerating resistor therefor, a controller for gradually excluding the resistor from the circuit, said controller comprising a plurality of stationary contact members and a movable member adapted to sweep over the stationary members, and means for actuating said movable member to gradually exclude the resistor at a speed that varies inversely as the current traversing the main motor circuit varies.

3. A control system comprising a main motor, an accelerating resistor therefor, a controller for gradually excluding the resistor from the circuit, said controller comprising a plurality of stationary contact members and a movable member adapted to sweep over the stationary members, means for actuating said movable member at a speed that varies inversely with the current traversing the motor circuit, said means comprising a pilot motor having a single field magnet winding in series with the main motor.

4. A control system comprising a main motor, a resistor, a plurality of independently operated switches for short circuiting the resistor in sections, a controller for producing a sequential operation of the short circuiting switches and means for actuating the controller at a speed that varies inversely as the current traversing the main motor circuit during the acceleration of the main motor varies.

5. A control system comprising a main motor, a resistor, a plurality of independently operated switches for short circuiting the resistor in sections, a controller for producing a sequential operation of the short circuiting switches, a pilot motor for operating the controller so arranged that it automatically varies the speed of said controller inversely as the current traversing the main motor circuit during the acceleration of the main motor varies.

6. A control system comprising a main motor, a resistor, a plurality of independently operated switches for short circuiting the resistor in sections, a controller for producing a sequential operation of the short circuiting switches, and means for actuating said controller at a speed that varies inversely with the current traversing the main motor circuit, said means comprising a pilot motor having a field magnet winding that is in circuit with said main motor.

7. A system of control comprising a main motor, a resistor and a controller for gradually short circuiting the resistor, said controller comprising a plurality of stationary contact members and a movable contact member adapted to sweep over the stationary members and means tending to return the movable member to its off position, a pilot motor for operating the movable member, and a clutch between the pilot motor and the movable member which is actuated only when current is supplied to the main motor, said pilot motor being responsive to the current traversing the main motor circuit.

8. A control system comprising a motor, a resistor, a controller for gradually short circuiting the resistor, a pilot motor for actuating said controller at a rate varying inversely with the current traversing the main motor circuit, and means comprising an electromagnetic clutch for controlling the operative connection of said pilot motor to said controller.

In testimony whereof, I have hereunto subscribed my name this 12th day of September, 1911.

THEODORE VARNEY.

Witnesses:
D. H. MACE,
B. B. HINES.